United States Patent
Lee et al.

(10) Patent No.: US 11,411,905 B2
(45) Date of Patent: Aug. 9, 2022

(54) BULK MESSAGING DETECTION AND ENFORCEMENT

(71) Applicant: Proofpoint, Inc., Sunnyvale, CA (US)

(72) Inventors: Thomas Lee, Kensington, CA (US); Sarah Solieman, Los Angeles, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 17/356,034

(22) Filed: Jun. 23, 2021

(65) Prior Publication Data

US 2022/0141165 A1 May 5, 2022

Related U.S. Application Data

(60) Provisional application No. 63/107,197, filed on Oct. 29, 2020.

(51) Int. Cl.
| | |
|---|---|
| *H04L 51/00* | (2022.01) |
| *G06F 16/955* | (2019.01) |
| *H04L 51/58* | (2022.01) |
| *H04W 4/14* | (2009.01) |
| *H04L 9/40* | (2022.01) |

(52) U.S. Cl.
CPC ............ *H04L 51/12* (2013.01); *G06F 16/955* (2019.01); *H04L 51/38* (2013.01); *H04L 63/0245* (2013.01); *H04L 63/1441* (2013.01); *H04L 63/1483* (2013.01); *H04W 4/14* (2013.01)

(58) Field of Classification Search
CPC ... G06F 16/955; H04L 51/38; H04L 63/0245; H04L 63/1441; H04L 63/1483; H04L 51/12; H04W 4/14
See application file for complete search history.

(56) References Cited

U.S. PATENT DOCUMENTS

| | | | |
|---|---|---|---|
| 10,397,256 B2 * | 8/2019 | Kashi | .................. H04L 63/1425 |
| 10,848,618 B1 * | 11/2020 | Quilici | .............. H04M 3/42059 |
| 11,184,393 B1 * | 11/2021 | Gendre | ............... H04L 63/1483 |

(Continued)

OTHER PUBLICATIONS

Dudley, William, "For SMS messaging, getting routing right is important", May 2, 2016, https://blogs.sap.com/2016/05/02/for-sms-messaging-getting-routing-right-is-important/ (Year: 2016).*

(Continued)

*Primary Examiner* — Ramy M Osman
(74) *Attorney, Agent, or Firm* — Banner & Witcoff, Ltd.

(57) ABSTRACT

Aspects of the disclosure relate to providing commercial and/or spam messaging detection and enforcement. A computing platform may receive a plurality of text messages from a sender. It may then tokenize the plurality of text messages to yield a plurality of tokens. The computing platform may then match one or more tokens of the plurality of tokens in the plurality of text messages to one or more bulk string tokens. Next, it may detect one or more homoglyphs in the plurality of text messages, and then detect one or more URLs in the plurality of text messages. The computing platform may flag the sender based at least on the one or more matching tokens, the one or more detected homoglyphs, and the one or more detected URLs. Based on flagging the sender, the computing platform may block one or more messages from the sender.

17 Claims, 6 Drawing Sheets

(56) References Cited

U.S. PATENT DOCUMENTS

| | | | | |
|---|---|---|---|---|
| 2004/0073617 | A1* | 4/2004 | Milliken | G06F 21/562 |
| | | | | 709/224 |
| 2005/0278620 | A1* | 12/2005 | Baldwin | H04L 51/12 |
| | | | | 715/201 |
| 2006/0259551 | A1 | 11/2006 | Caldwell | |
| 2008/0196099 | A1* | 8/2008 | Shastri | H04L 63/1441 |
| | | | | 726/12 |
| 2008/0201411 | A1* | 8/2008 | Paritosh | H04L 63/0245 |
| | | | | 709/203 |
| 2012/0215853 | A1* | 8/2012 | Sundaram | H04L 63/1441 |
| | | | | 709/206 |
| 2015/0281153 | A1* | 10/2015 | Murtagh | H04L 51/38 |
| | | | | 709/206 |
| 2015/0312186 | A1* | 10/2015 | Giura | H04L 51/12 |
| | | | | 709/206 |
| 2016/0323725 | A1* | 11/2016 | Lew | H04L 51/12 |
| 2018/0081991 | A1* | 3/2018 | Barber | G06F 16/90335 |
| 2018/0278627 | A1* | 9/2018 | Goutal | H04L 63/1416 |
| 2018/0351897 | A1* | 12/2018 | Istrati | H04W 4/14 |
| 2020/0067861 | A1 | 2/2020 | Leddy et al. | |
| 2020/0366712 | A1* | 11/2020 | Onut | H04L 63/1416 |
| 2020/0412746 | A1* | 12/2020 | Regentov | H04L 63/1425 |
| 2021/0336983 | A1* | 10/2021 | Lee | H04L 63/126 |

OTHER PUBLICATIONS

Twilio, "Forbidden message categories for SMS and MMS in the US and Canada ", Apr. 15, 2021, https://support.twilio.com/hc/en-us/articles/360045004974-Forbidden-message-categories-for-SMS-and-MMS-in-the-US-and-Canada (Year: 2021).*

Mar. 11, 2022—(EP) Extended Search Report—App 21200606.8.

* cited by examiner

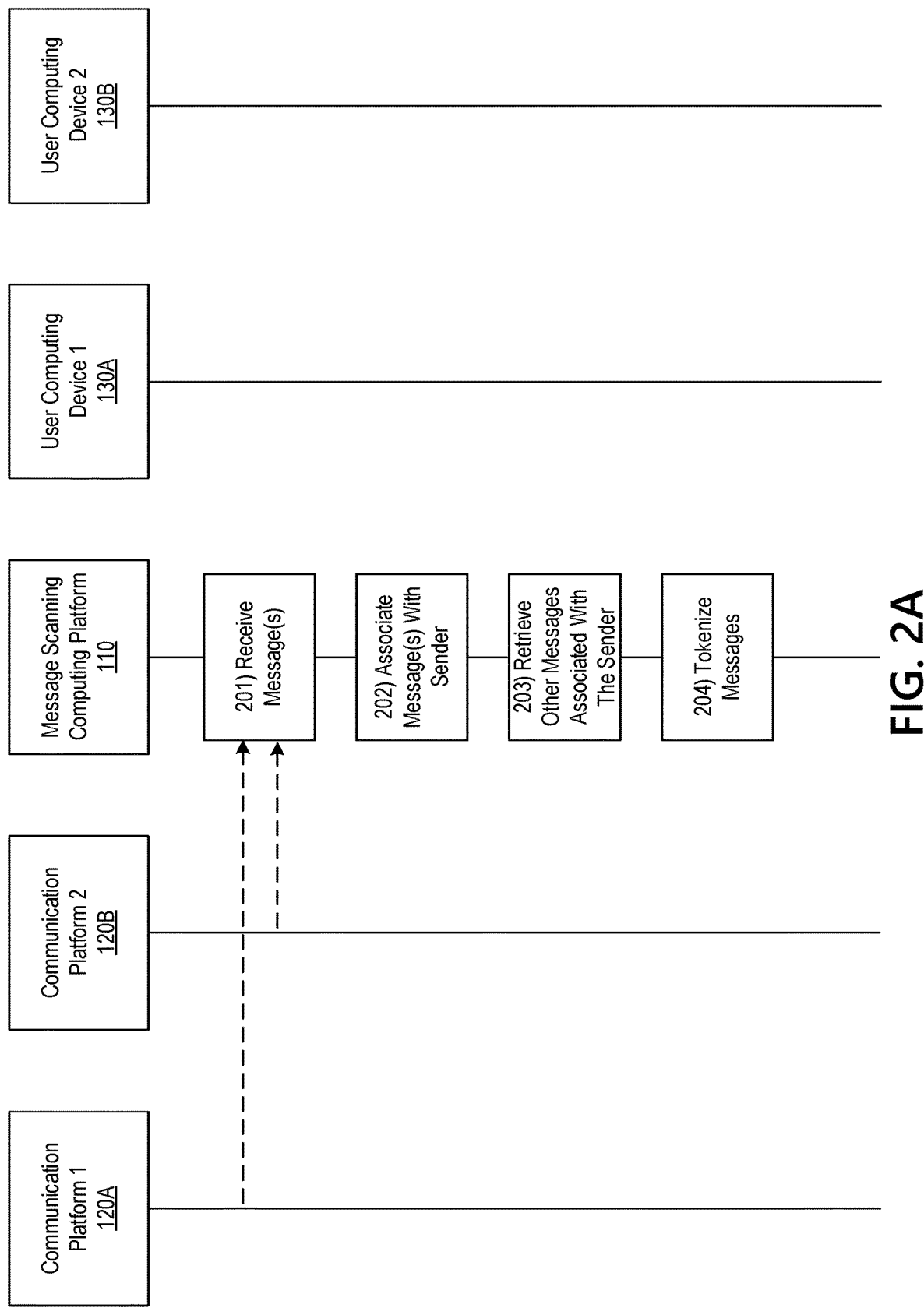

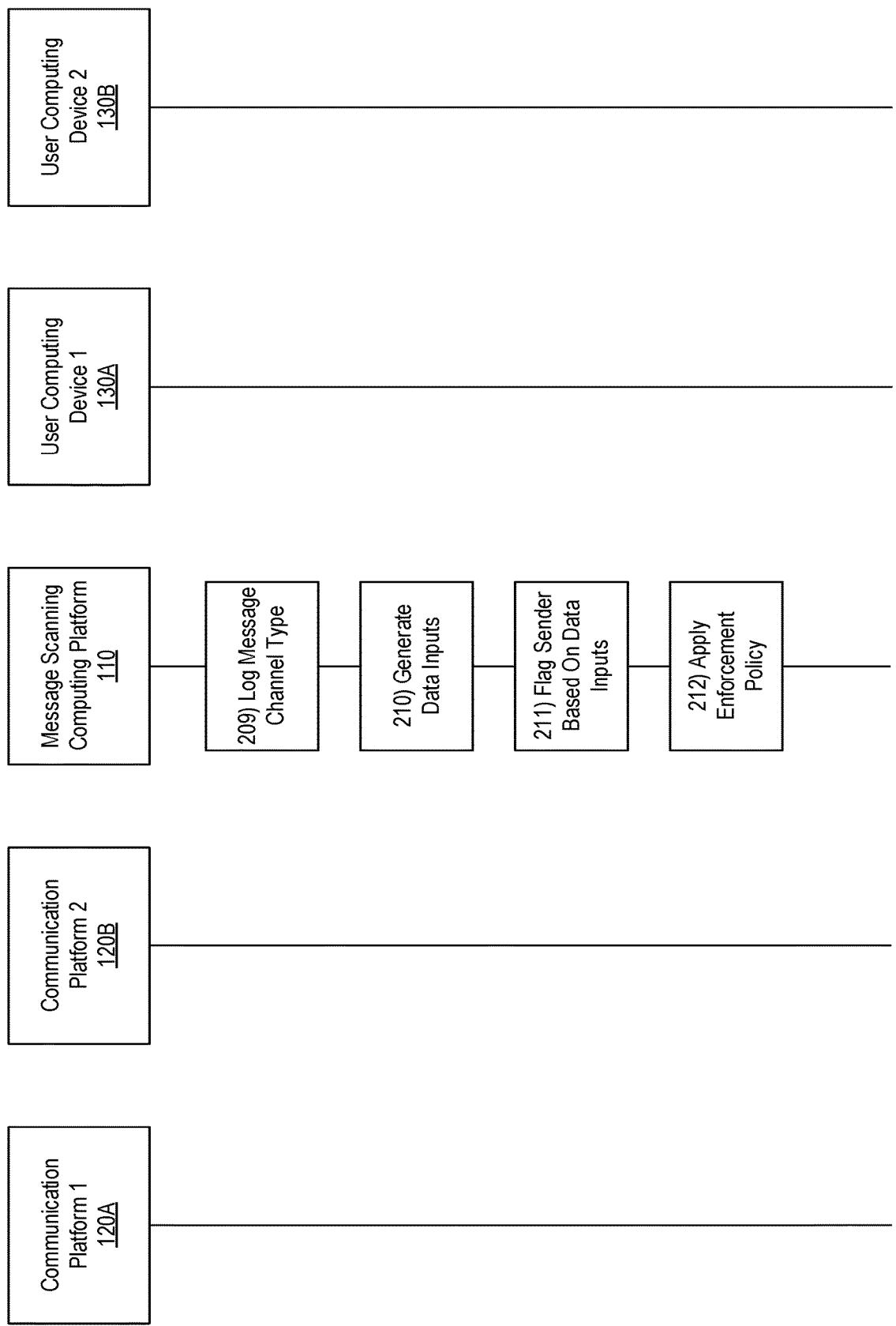

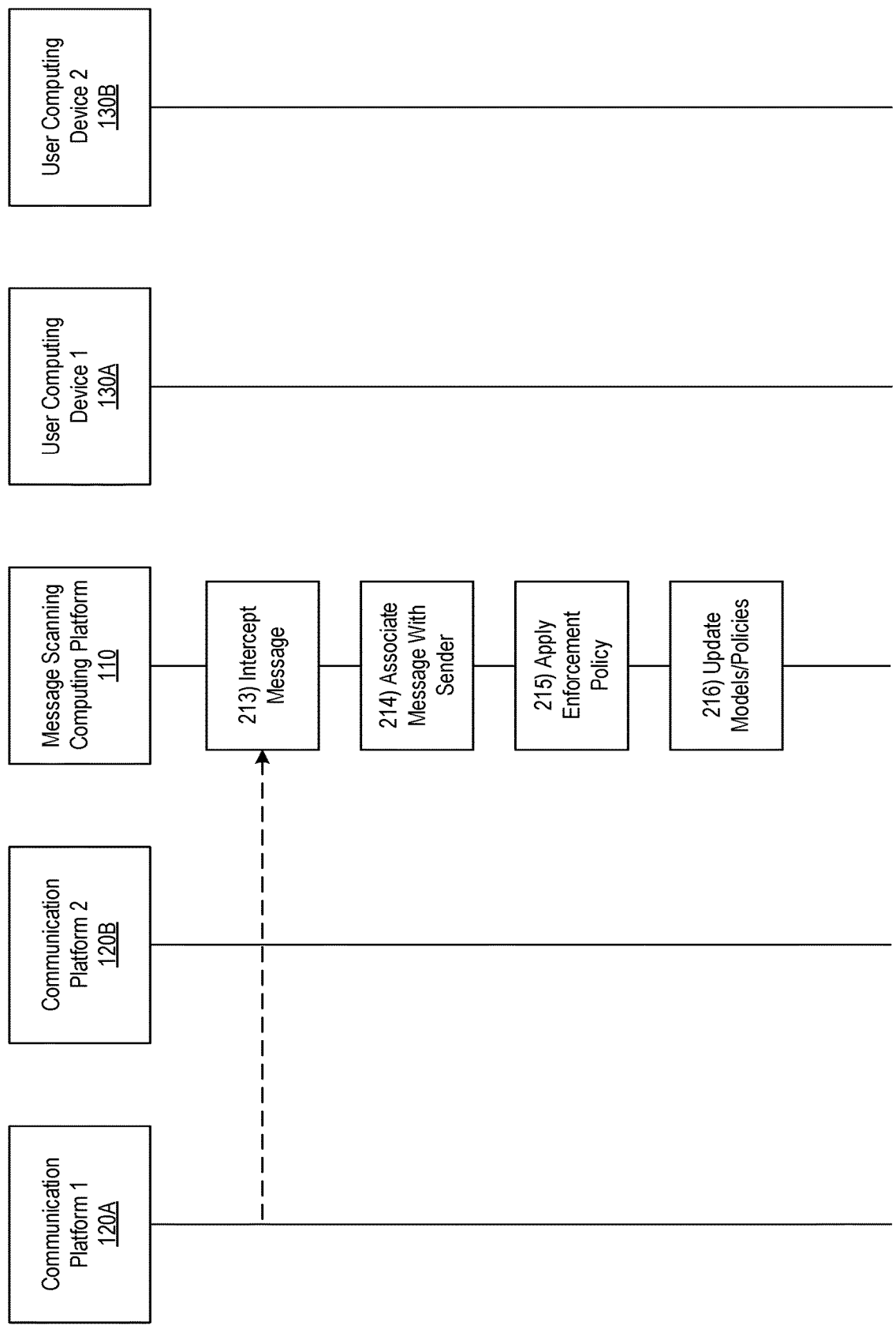

BULK MESSAGING DETECTION AND ENFORCEMENT

CROSS-REFERENCE TO RELATED APPLICATIONS

This application claims the benefit of and priority to U.S. Provisional Patent Application Ser. No. 63/107,197, filed Oct. 29, 2020, and entitled "Tokenizing Sub-Parts of Messages Bodies+Other Filtering" which is incorporated by reference herein in its entirety.

TECHNICAL FIELD

Aspects of the disclosure relate to message processing and management systems, data processing methods, and communication systems and networks. In particular, one or more aspects of the disclosure relate to messaging systems that send messages to user devices, including text messages such as SMS messages.

BACKGROUND

Organizations and individuals face increasing amounts of unwanted messaging via electronic communications. Although efforts have been made to block delivery or otherwise filter unwanted advertisements and other forms of spam messages, senders of spam messages have developed tactics and strategies that are sometimes effective in avoiding the filtering and blocking systems. Additionally, in response to increasing charges levied on commercial bulk messages—for example, the relatively higher costs for sending application to person (A2P) charges for SMS messaging as opposed to person to person (P2P) messages—some commercial senders sometimes try to disguise their commercial messages as P2P messages to avoid the increased charges.

SUMMARY

Aspects of the disclosure provide technical solutions that overcome one or more of the technical problems described above and/or other technical challenges. For instance, one or more aspects of the disclosure relate to automatically recognizing when senders are sending spam messages and/or sending bulk messages (e.g., commercial messages) via improper channels. After identifying senders associated with messages and determining whether a sender is a bulk and/or spam sender, enforcement policies may be applied that restrict traffic from the sender to proper channels (e.g., A2P channels) or block it entirely.

In accordance with one or more embodiments, a computing platform having at least one processor, a communication interface, and memory may receive, via the communication interface, a plurality of text messages from a sender; tokenize, by the one or more processors, the plurality of text messages to yield a plurality of tokens; match, by the one or more processors, one or more tokens of the plurality of tokens in the plurality of text messages to one or more bulk string tokens; detect, by the one or more processors, one or more homoglyphs in the plurality of text messages; detect, by the one or more processors, one or more URLs in the plurality of text messages; flag, by the one or more processors, the sender based at least on the one or more matching tokens, the one or more detected homoglyphs, and the one or more detected URLs; and based on flagging the sender, block one or more messages from the sender.

In one or more embodiments, the plurality of messages may be received via a P2P channel, the sender may be flagged as a commercial sender, and the computing platform may transmit, via the communication interface, to the sender, a notification that future messages must be delivered via an A2P channel. Additionally or alternatively, the sender may be flagged as a spam sender.

In one or more embodiments, the computing platform may retrieve a training data set, the training data set may include input data comprising data indicating one or more bulk string tokens in text messages, data indicating homoglyphs in text messages, and data indicating URLs in text messages, and the target data may comprise an indication of a flag to be applied to the messages; and may train a model to output target data based on input data using the training data set. In some cases, the flagging of the sender may comprise using the one or more matching tokens, the one or more detected homoglyphs, and the one or more detected URLs to generate inputs to the model; and providing the inputs to the model to generate an output, wherein the output indicates that the sender should be flagged. In some cases, the inputs to the model may include frequency information for the one or more matching tokens, the one or more detected homoglyphs, or the one or more detected URLs.

In one or more embodiments, the computing platform may receive the text messages from a plurality of different telephone numbers and may use a clustering algorithm to associate the plurality of different telephones numbers with the sender. In some cases, blocking additional messages from the sender may comprise blocking text messages received from the plurality of different telephone numbers.

In one or more embodiments, the computing platform may categorize one or more of the matched tokens into a category associated with the bulk string token, and the category may be selected from a list of categories, wherein the list of categories includes one or more of an advertisement, spam, or a political message.

In one or more embodiments, the computing platform may, prior to flagging the sender, compare the number of the plurality of messages received to a threshold; and based on the number not satisfying the threshold, wait to receive additional messages before flagging the sender.

In one or more embodiments, the detecting of the homoglyphs may comprise analyzing the message to detect a most common script of character used in the message; and detecting a homoglyph based on detecting a character of the message that is a different script from the most common script. Additionally or alternatively, the detecting of the homoglyphs may comprise substituting at least one character of a word for a homoglyph; comparing the word with the substituted character to a dictionary; and detecting that at least one character of the word is a homoglyph based on the comparison.

In one or more embodiments, the computing platform may categorize the detected URLs as one or more of unknown URLs, URLs associated with spam, or URLs associated with commercial domains.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for performing commercial and spam messaging detection and enforcement accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to techniques for dealing with unwanted messaging delivered via electronic communications. To prevent spam and other bulk message senders from abusing filtering and blocking systems, automated techniques may be necessary to recognize spam and bulk messaging and ensure it may be either transmitted through proper channels or blocked entirely. Because spam senders and other abusive bulk senders frequently change tactics to avoid blocking and filtering solutions, automated and flexible techniques may be needed for quickly recognizing spam and other abusive senders and adjusting enforcement policies to deal with them.

Accordingly, techniques described below may provide automated and flexible solutions for recognizing when senders are sending spam messages and/or sending bulk messages, and may apply appropriate enforcement policies. The techniques may be iterative such that, even if senders try to avoid enforcement by changing their identifiers (e.g., phone numbers), changing the type or content of messages they send, or otherwise changing tactics, the spam or otherwise abusive senders may be recognized and enforcement policies may be applied.

Techniques described below further enable selective enforcement based on a channel used by a sender or a type of message. For example, in the context of SMS messages, application to person (A2P) channels are designed to be used by businesses and advertisers for bulk or commercial messages, and may be associated with higher fees. To get around the higher fees, businesses or other entities sometimes send bulk or commercial mail via person to person (P2P) channels. Techniques described below enable the automated recognition and blocking of commercial/bulk messages that are inappropriately sent via P2P channels. Additionally, techniques described below allow users to specify what types of messages they would like to have blocked, and provide for selective blocking of spam or bulk messages based on user preferences.

Figure 1:
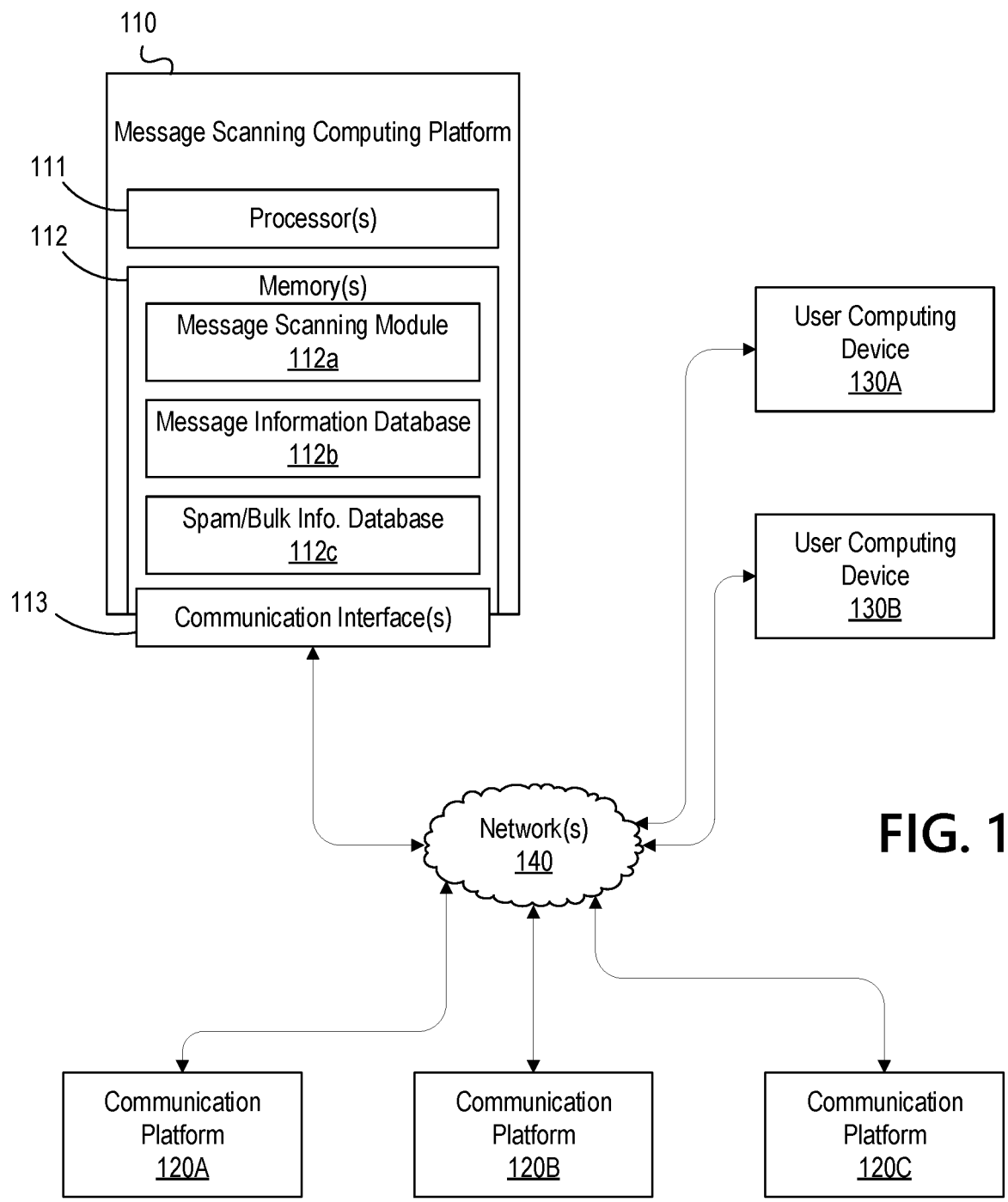
FIG. 1 depicts an illustrative operating environment for performing commercial and spam messaging detection and enforcement in accordance with one or more example embodiments.

FIG. 1 depicts an illustrative operating environment for performing bulk messaging detection and enforcement in accordance with one or more example embodiments. Referring to FIG. 1, computing environment 100 may include various computer systems, computing devices, networks, and/or other operating infrastructure. For example, computing environment 100 may include a message scanning computing platform 110, communication platforms 120, user computing devices 130, and one or more network(s) 140.

Network(s) 140 may include one or more wired networks and/or one or more wireless networks that interconnect the message scanning computing platform 110, communication platforms 120, user computing devices 130, and/or other computer systems and/or devices. In addition, each of the message scanning computing platform 110, communication platforms 120, and user computing devices 130 may be special purpose computing devices configured to perform specific functions, as illustrated in greater detail below, and may include specific computing components such as processors, memories, communication interfaces, and/or the like.

The message scanning computing platform 110 may include one or more processor(s) 111, one or more memory(s) 112, and one or more communication interface(s) 113. In some instances, message scanning computing platform 110 may be made up of a plurality of different computing devices (e.g., arranged as a computing platform), which may be distributed within a single data center or a plurality of different data centers. In these instances, the one or more processor(s) 111, one or more memory(s) 112, and one or more communication interface(s) 113 included in message scanning computing platform 110 may be part of and/or otherwise associated with the different computing devices that form message scanning computing platform 110.

In one or more arrangements, processor(s) 111 may control operations of message scanning computing platform 110. Memory(s) 112 may store instructions that, when executed by processor(s) 111, cause message scanning computing platform 110 to perform one or more functions, as discussed below. Communication interface(s) 113 may include one or more wired and/or wireless network interfaces, and communication interface(s) 113 may connect message scanning computing platform 110 to one or more networks (e.g., network 140) and/or enable message scanning computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause message scanning computing platform 110 to perform various functions) and/or databases (which may, e.g., store data used by message scanning computing platform 110 in performing various functions). For example, memory(s) 112 may store and/or otherwise provide a message scanning module 112a, a message information database 112b, and a spam/bulk information database 112c. In some instances, the message scanning module 112a may store instructions that cause message scanning computing platform 110 to implement bulk mail detection and enforcement, and/or one or more other functions described herein. Additionally, the message information database 112b may store information that message scanning computing platform 110 may use to implement bulk mail detection and enforcement, and/or one or more other functions described herein. Furthermore, the spam/bulk information database 112c may store data that may be used by message scanning computing platform 110 to perform bulk mail detection and enforcement, and/or in executing one or more other functions described herein.

The communication platforms 120 may be configured to send messages using a communications service (e.g., short message service (SMS)). The communication platform 120 may be a server device used to send bulk or spam messages to users. The communications platform 120 may also be a communications platform as a service (CPaaS) that provides bulk messaging sending capabilities. Alternatively, the communication platform 120 may be a consumer device or any other device that may be used to send bulk or spam messages to users. In other words, the communication platforms 120 may be any device that sends a text message to another user.

The user computing devices 130 may be configured to be used by respective users to receive messages from the communication platforms 120, and may also be able to send messages. The user computing devices 130 could be user-owned devices, employer-provided devices, or other types of devices used by respective users. The user computing devices 130 may be configured to present one or more user interfaces associated with messaging functions as described below.

In one or more arrangements, a communication service (e.g., SMS) involves many different devices, and any given device may be able to receive and send various types of messages, including text messages, from and to any number of other devices. As used herein, the communication platforms 120 and the user computing devices 130 may represent respective senders and recipients of bulk or spam messages in order to illustrate one or more aspects of the disclosure. Thus, although the examples below describe the communication platforms 120 sending exemplary text message(s) to the user computing devices 130, which may be flagged as bulk or spam messages, some implementations of the disclosure may include many senders and receivers of text messages, which may be capable of sending various messages to each other.

Text messages may include any message that may be sent between devices and that could potentially include bulk or spam text. As used herein, bulk text and/or bulk messages may include automated messages informing users of status updates, product updates, offers, promotions, or other such content, whether requested by the user or not. Spam messages may include unwanted or undesirable automated messages, usually sent without the receiver's consent. Text messages may be spam and/or bulk messages, as described below. Text messages may include short message service (SMS) messages, multimedia messaging service (MMS) messages, chat messages, instant messages, and other types of messages that include text.

Figure 2B:
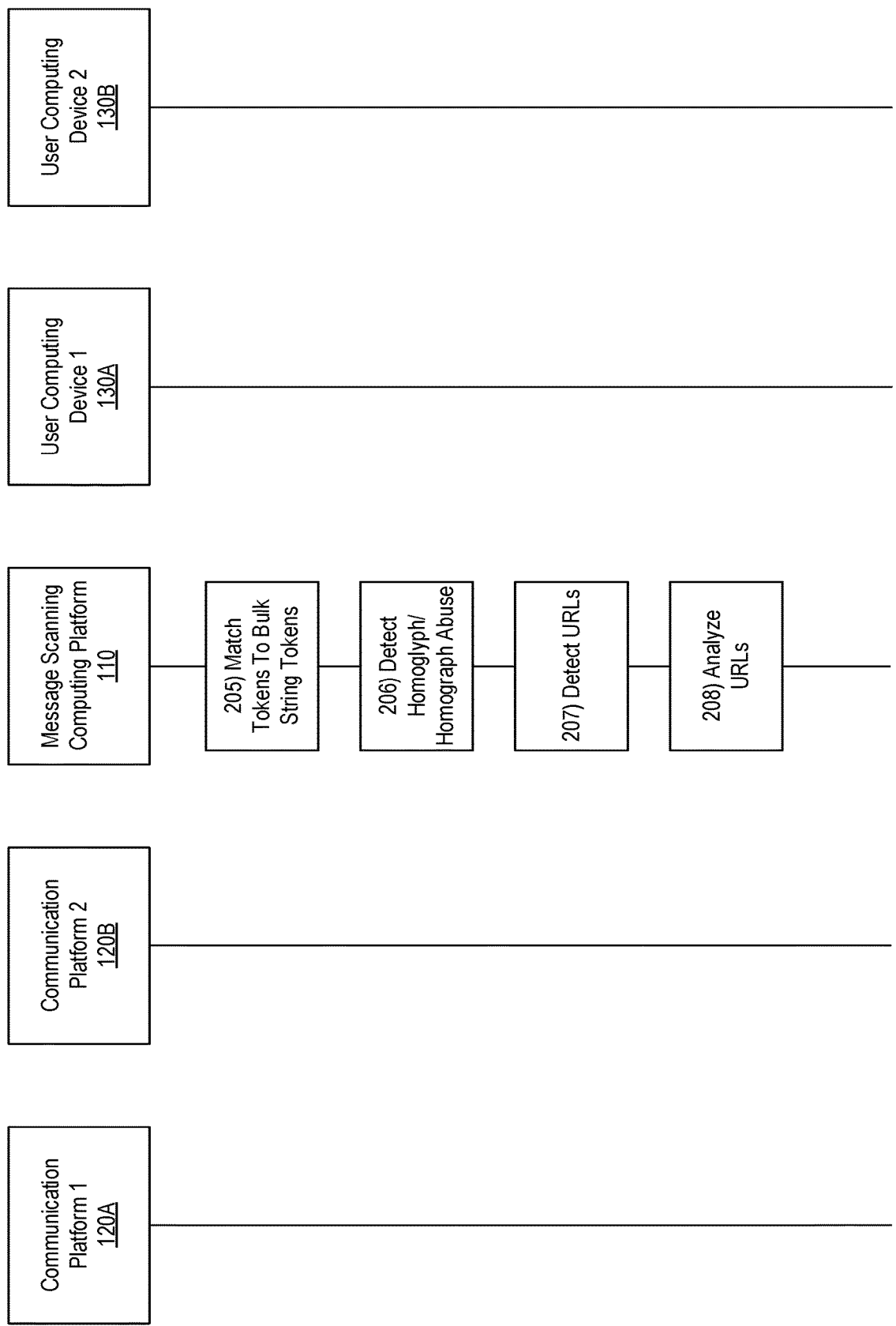

FIGS. 2A-2D depict an illustrative event sequence for performing bulk mail detection and enforcement in accordance with one or more example embodiments. Referring to FIG. 2A, at step 201 the message scanning computing platform 110 receives one or more text messages sent from multiple communication platforms 120 (e.g., communications platform 120a and/or communications platform 120b). The messages may be in transit to one or more user computing devices 130 (e.g., user computing device 130a and/or user computing device 130b). For example, the communications platform 120a may send out one or more text messages to various users for spam purposes and/or bulk purposes such as notifications, promotions, and the like. In some cases, a single entity may use multiple communication platforms 120 (e.g., communications platform 120a and communications platform 120b) to send out messages. Thus, for example, a single sender may use the communications platform 120a and the communications platform 120b to send out messages to users associated with each user computing device 130. The different communication platforms 120 may not indicate that they are from the same sender (e.g., one may use one phone number, and another may use a different phone number), especially in the case of spam messages. Additionally, each communications platform 120 may use multiple sender identifiers (e.g., multiple phone numbers). For example, if the communications platform 120a sends multiple text messages to the user computing device 130a, some of the test messages may originate from a first phone number and some may originate from a second phone number.

At step 202, the message scanning computing platform 110 may associate the one or more messages received at step 201 to a particular sender. In some cases, the message scanning computing platform 110 may store information about various senders and associated identifiers they use (e.g., in message information database 112b), so linking the message to a particular sender may merely involve correlating the message identifier (e.g., a phone number) to a known sender. However, in many cases the message scanning computing platform 110 may not have information for correlating the identifier to a particular sender. For example, spammers may take steps to actively hide their identities, and other commercial senders may send bulk messages via unknown identifiers in order to avoid bulk message fees. Additionally, some phone numbers may be shared between senders, such that a phone number does not indicate a particular sender.

Accordingly, the message scanning computing platform 110 may be configured to perform a message analysis in order to determine a sender associated with a particular message. For example, the message scanning computing platform 110 may compare the content, header information, and/or other metadata for a message to message information for previously received messages (which may be stored in message information database 112b). Thus, when a newly-received message matches and/or is similar in content, header information, and/or other metadata to one or more previously-received messages, the message scanning computing platform 110 may determine that the newly-received message and the previously-received message(s) are from the same sender. The message scanning computing platform 110 may use thresholds to determine similarity. For example, if more than a certain percent of characters or words are the same, a match may be found. Additionally or alternatively, clustering and/or machine-learning techniques may be used to determine whether a plurality of messages are from a single sender. In some cases, the message scanning computing platform 110 may determine that multiple messages are from a sender, but may not have any information about the identity of the sender. Accordingly, the message scanning computing platform 110 may identify unknown senders (e.g., using a unique identifier) even when it has no other information about the sender's identity.

At step 203, the message scanning computing platform 110 may retrieve other messages associated with the sender for analysis. The other messages may be temporarily stored at the message scanning computing platform 110 so that sender messages may be analyzed together to determine whether enforcement action should be taken against the sender (e.g., if the sender is spamming messages, sending "gray mail" messages that use P2P channels for commercial traffic, or the like). In some cases, the message scanning computing platform 110 may wait for additional messages to be received and associated with the sender before proceeding with the message analysis (e.g., beginning at step 204), in order to avoid false positives. Additionally or alternatively, the message scanning computing platform 110 may only proceed to analyze the messages (e.g., beginning at step 204) if the messages are received at a certain rate (e.g., a certain number of messages per minute, per hour, etc.), in order to avoid a false positive on non-bulk messaging.

At step 204, the message scanning computing platform 110 may begin analyzing the messages by tokenizing the messages to yield one or more tokens per message. The message scanning computing platform 110 may use a tokenization algorithm to split a message into tokens that may include words and/or phrases from the message. For example, if a message includes the phrase "Reply 'stop' to unsubscribe" the tokenization algorithm may generate the tokens "reply," "stop," "to," and "unsubscribe." Additionally or alternatively, tokens may include multiple words such as "reply stop." In some cases, certain common words may be discarded from the list of tokens. For example, the token "to" may be discarded from the list of tokens generated from the example phrase above, leaving the message scanning computing platform 110 with the tokens "reply," "stop," and "unsubscribe."

Turning to FIG. 2B, at step 205, the message scanning computing platform 110 may match the single-word and/or multi-word tokens generated from the message to one or more bulk strings. The message scanning computing platform 110 may store a list or other data structure containing bulk strings in a database (e.g., in database 112c). The bulk strings may be words or phrases that are commonly used in bulk and/or spam messages. For example, phrases such as "reply 'STOP' to cancel messages" and other similar phrases may be commonly used in bulk and/or spam messages, and therefore the database of bulk strings may include tokens such as "reply," "stop", "cancel," "unsubscribe," and the like. However, the database of bulk strings may omit other words such as "to" or "messages" that may be used frequently in non-bulk and non-spam contexts.

The bulk strings may include multiple words instead of or in addition to single words, such as "reply stop," "vote for," and the like. Additionally, the bulk strings may be templates that use regular expressions to match varying phrases. For example, a bulk string template such as "vote*for*" (with the asterisks substituting for any word) would match a multi-word token containing the phrase "vote Smith for city council." Similarly, a bulk string template such as "you won a free*" would match a multi-word token containing the phrase "you won a free trip to Hawaii."

The message scanning computing platform 110 may use categories associated with bulk strings to apply categories to messages. For example, a bulk string such as "vote" may be associated with the category "political," and therefore the message scanning computing platform 110 may tag messages with tokens matching this bulk string as "political" messages. Similarly, other bulk strings may be associated with categories such as "call to action" (e.g., for bulk strings requesting a user to take some action such as click a link, send a message, or the like), "advertisement," "spam," or the like.

As the message scanning computing platform 110 detects matches, it may log data based on the matches. For example, the message scanning computing platform 110 may analyze 100 messages (that were retrieved in step 203) and find 75 bulk string matches. As another example, the message scanning computing platform 110 may analyze 100 messages and determine that 50 are associated with "spam" tags and 75 are associated with "call to action" tags. The message scanning computing platform 110 may log the number of bulk string matches and/or tags per message and/or for the set of messages for further analysis.

At step 206, the message scanning computing platform 110 may further analyze the set of messages to detect abuse of homoglyphs and/or homographs. As used herein, homoglyphs are characters that appear similar but are encoded differently by computing devices. For example, a Cyrillic "a" and a Latin "a" may appear to be similar or identical in many fonts, but use different Unicode encodings. As another example, characters with accents (e.g., "a") may be homoglyphs of characters without accents. Spammers sometimes use homoglyphs in an attempt to avoid algorithms for detecting, filtering, and/or blocking spam. For example, a spammer may use a Cyrillic "a" and Latin "c," "n," "e," and "l" to spell the word "cancel." This word is a homograph for the word "cancel" that uses all Latin characters. Although the strings may appear similar or identical, a simple comparison of the two strings may not return a match because the "a" is encoded differently.

The message scanning computing platform 110 may use several strategies to detect abuse of homoglyphs and homographs. For example, if a single word contains characters from different scripts (e.g., one character from the Cyrillic script mixed with other characters from the Latin script), then the message scanning computing platform 110 may detect that the different script character is a homoglyph and the word containing it is a homograph. If the message scanning computing platform 110 detects that a message as a whole contains a dominant script of characters (e.g., mostly Latin characters), then characters from other scripts appearing anywhere in the message may also be detected as homoglyphs.

The message scanning computing platform 110 may also detect homographs using a database of homoglyphs (e.g., in spam/bulk information database 112c) and/or a dictionary of words. For example, the database of homoglyphs may associate a Latin "a" with a Cyrillic "a," an accented "a," and other similar characters that are homoglyphs. The message scanning computing platform 110 may then compare a token to a dictionary word in order to determine whether a homograph is being used. For example, if a message contains the word "cancel," which may not match any dictionary word, the message scanning computing platform 110 may detect a partial match with the word "cancel," and may use the database of homoglyphs to determine that "a" is a homoglyph of "a." By detecting a partial dictionary match and then detecting a dictionary match when one character is substituted for a homoglyph, the message scanning computing platform 110 may detect a homograph that may be used to avoid anti-spam software.

As the message scanning computing platform 110 detects homoglyphs and homographs, it may log data based on the matches. For example, the message scanning computing platform 110 may analyze 100 messages (that were retrieved in step 203) and find 200 homoglyphs and 125 homographs. The message scanning computing platform 110 may log the number of homoglyphs and/or homographs per message and/or for the set of messages for further analysis.

At step 207, the message scanning computing platform 110 may detect any uniform resource locators (URLs) that appear in the messages. URL links are commonly included in messages for various reasons. Spammers often include URLs that link to undesired or harmful content. The message scanning computing platform 110 may detect URLs using regular expressions and log the detected URLs for further analysis. At step 208, the message scanning computing platform 110 may analyze the URLs to determine whether they link to content that is associated with unknown domains, known commercial domains, known spammer domains, or the like. For example, the message scanning computing platform 110 may maintain a database of domain names, each associated with an indication of whether the particular domain name is a commercial domain, is known to be used by spammers, or the like. Additionally or alternatively, the message scanning computing platform 110 may access the URL and scan the content available at the URL to determine whether the content is commercial content, spam content, or some other type of content.

As the message scanning computing platform 110 analyzes URLs, it may log data based on the analysis. For example, the message scanning computing platform 110 may analyze 100 messages (that were retrieved in step 203) and find a first URL including a known commercial domain in 50 messages, a second URL including a known commercial domain in 30 messages, a third URL including a known spammer domain in 15 messages, and a fourth URL that contains an unknown domain in ten of the messages. The message scanning computing platform 110 may log all of this data for further analysis.

Turning to FIG. 2C, at step 209, the message scanning computing platform 110 may log whether each of the messages (e.g., the messages retrieved at step 203) was sent via an A2P or a P2P channel. As described above, A2P channels are designed to be used by businesses and advertisers for bulk or commercial messages, and may be associated with higher fees. To get around the higher fees, businesses or other entities sometimes send bulk or commercial mail via P2P channels. Thus if commercial mail is being sent via P2P channels, it should be blocked or re-rerouted to A2P channels. Accordingly, the message scanning computing platform 110 may log the type of channel for each message.

At step 210, the message scanning computing platform 110 may process the data gathered and logged above (e.g., at steps 203-209) to generate data that may be used as inputs to one or more rules, thresholds, or models for detecting whether the messages are commercial or spam messages. As part of generating the inputs, the message scanning computing platform 110 may generate frequency data based on the logged data. For example, the message scanning computing platform 110 may analyze the logged data for bulk string token matches to detect that 40% of the messages from a particular sender include bulk string matches and/or that 50% of the messages are tagged as "spam." As another example, the message scanning computing platform 110 may analyze the logged data for homoglyphs and/or homographs to detect that 20% of the messages used homoglyphs and/or homographs. As another example, the message scanning computing platform 110 may analyze the logged data for URLs to detect that 60% of the messages include commercial domains, 15% of the messages include spammer domains, and 10% of the messages include unknown domains. In some cases, the frequency data may be logged by type of channel (e.g., A2P vs. P2P). For example, the message scanning computing platform 110 may detect that 50% of P2P messages from a particular sender use bulk strings, and 60% of the P2P messages include URLs.

At step 211, the message scanning computing platform 110 uses the inputs to decide whether to flag the sender as a commercial sender and/or a sender of spam messages (i.e., unwanted and unsolicited messages). The message scanning computing platform 110 may use several techniques to detect a commercial and/or spam sender based on the inputs identified above. For example, the message scanning computing platform 110 may compare frequency data (e.g., as generated at step 210) to one or more rules or thresholds. For example, if more than 10% of the messages include spam URLs, the message scanning computing platform 110 may flag the sender as a spam sender. As another example, if more than 10% of the messages include homoglyphs and/or homographs, the message scanning computing platform 110 may flag the sender as a spam sender. Additionally or alternatively, the message scanning computing platform 110 may use one or more regression model(s) that take inputs and output an indication of whether the sender is a commercial and/or spam sender. The inputs may include the inputs generated by the message scanning computing platform 110 (e.g., in step 210) and/or other data derived from an analysis of the messages. For example, the inputs to the regression model may include one or more of a percent of messages that contain bulk string matches and/or particular tags, a number of bulk string matches and/or particular tags appearing in a set of messages, a percentage of messages that contain homoglyphs and/or homographs, a number of homoglyphs and/or homographs that appear in the set of messages, a percentage of messages that include URLs, commercial URLs, spam URLs, and/or unknown URLs, a number of URLs, commercial URLs, spam URLs, and/or unknown URLs that appear in a set of messages, and/or whether the messages are A2P or P2P messages.

In addition to or instead of rules, thresholds, and/or regression models, the message scanning computing platform 110 may use a machine learning model trained to output an indication of whether a sender is a commercial and/or spam sender based on information about the messages, such as the inputs generated by the message scanning computing platform 110 (e.g., at step 210). For example, the inputs to the machine learning model may include one or more of a percent of messages that contain bulk string matches and/or particular tags, a number of bulk string matches and/or particular tags appearing in a set of messages, a percentage of messages that contain homoglyphs and/or homographs, a number of homoglyphs and/or homographs that appear in the set of messages, a percentage of messages that include URLs, commercial URLs, spam URLs, and/or unknown URLs, a number of URLs, commercial URLs, spam URLs, and/or unknown URLs that appear in a set of messages, and/or whether the messages are A2P or P2P messages. The machine learning model may be trained to output one or more indications based on the above inputs or other inputs derived from messages information.

The message scanning computing platform 110 may have previously (e.g., prior to the process of FIG. 2) trained such a model using a training data set that correlates historical message data for different senders to output data indicating whether a particular sender is a commercial sender, a spam sender, or the like. For example, the training data set may correlate the output data to one or more of a percent of messages from a given sender that contain bulk string matches and/or particular tags, a number of bulk string matches and/or particular tags appearing in a set of messages from a given sender, a percentage of messages from the sender that contain homoglyphs and/or homographs, a number of homoglyphs and/or homographs that appear in the set of messages, a percentage of messages from the sender that include URLs, commercial URLs, spam URLs, and/or unknown URLs, a number of URLs, commercial URLs, spam URLs, and/or unknown URLs that appear in a set of messages, and/or whether various messages from the sender are A2P or P2P messages. Using this training data set and machine learning techniques, the message scanning computing platform 110 may generate a trained model that it may use to output similar output data indicating whether a particular sender is a commercial and/or spam sender based on the inputs generated at step 210.

The output of the trained model may be one or more score(s) (e.g., in a range of 0-100) indicating a likelihood that a particular sender is a spam and/or commercial sender. In these cases, the message scanning computing platform 110 may flag the sender as a spam and/or commercial sender based on a comparison to one or more thresholds (e.g., if a spam score is over 80, the sender may be flagged as a spammer; if a commercial sender score is over 70, the sender may be flagged as a commercial sender). Additionally or alternatively, the output of the trained model may directly indicate one or more labels/flags for whether the sender is a commercial sender, a spam sender, or not a commercial or spam sender.

At step 212, the message scanning computing platform 110 may generate and apply one or more enforcement policies for the sender based on the flag(s) that were output at step 211. For example, if the sender is flagged as a commercial sender but is using P2P channels for commercial messages, the message scanning computing platform 110 may send an automated warning to the sender that all future commercial traffic must be sent via A2P channels. Additionally or alternatively, the message scanning computing platform 110 may block all P2P messages from the commercial sender. If the sender is flagged as a spam sender, the message scanning computing platform 110 may similarly send one or more automated warnings, and also may determine to block all messages from the spammer (e.g., based on the flag). The message scanning computing platform 110 may associate the enforcement policy with an identifier of the sender (e.g., the identifier used at step 202 to identify the sender) and store the enforcement policy. The message scanning computing platform 110 may apply the enforcement policy to messages that were previously received (e.g., the message received at step 201 may be blocked based on the enforcement policy).

In some cases, the message scanning computing platform 110 may customize the enforcement policies per user. For example, one user may indicate that they do not wish to receive bulk messages tagged as "political," and another user may indicate that they do not wish to receive bulk messages with a call to action. The message scanning computing platform 110 may store such user preferences and generate customized enforcement profiles on a per-user basis.

In some cases, to enforce a policy, the message scanning computing platform 110 may send the enforcement policy to another device that is responsible for routing the messages to the user devices (e.g., the user computing devices 130A-B), and the routing device may implement the enforcement policy (e.g., by partially or completely blocking the messages from the sender). The message scanning computing platform 110 may send one or more identifiers associated with the sender so that the other device may be able to recognize and block messages from the sender.

Turning to FIG. 2D, at step 213, the message scanning computing platform 110 may receive another message that was sent by a sender associated with an enforcement policy. The message scanning computing platform 110 may delay delivery of the message to the intended destination (e.g., a first user computing device 130A) until the sender is identified and an enforcement policy is checked. Accordingly, at step 214, the message scanning computing platform 110 may associate the message with a sender. The message scanning computing platform 110 may use the same process described above for step 202 to identify the sender. Then, at step 215, the message scanning computing platform 110 may apply the enforcement policy that is associated with the identified sender (e.g., as discussed for step 212).

At step 216, the message scanning computing platform 110 may update its training data set based on the data generated according to the process of FIGS. 2A-2D and re-train one or more machine learning models (e.g., the machine learning model used at step 211). In some cases, outputs of the machine learning models may be verified (e.g., by a human or another source of information about senders) before using the output and the associated inputs to update a training data set. Thus, by using real world data to improve its training data and models, the message scanning computing platform 110 may be able to adapt to changing tactics and techniques used in attempts to circumvent policy enforcement.

Although the process of FIGS. 2A-2D describes a process that operates after receipt of a few example messages, in real word implementations the message scanning computing platform 110 may be frequently or constantly analyzing received messages, determining whether or not to flag senders, implementing and updating enforcement policies, and the like. Accordingly, the message scanning computing platform 110 may use an iterative process to update its enforcement policies over time. For example, in cases where a sender starts using a new identifier (e.g., a new phone number) to avoid enforcement, subsequent iterations through the process of FIGS. 2A-2D for the new messages may catch the new identifiers, associate them with the sender, and update the enforcement policy to include the new identifiers. Thus, the message scanning computing platform 110 can automatically identify and update its enforcement over time to keep up with abusive senders that may change numbers and other tactics.

Figure 3:
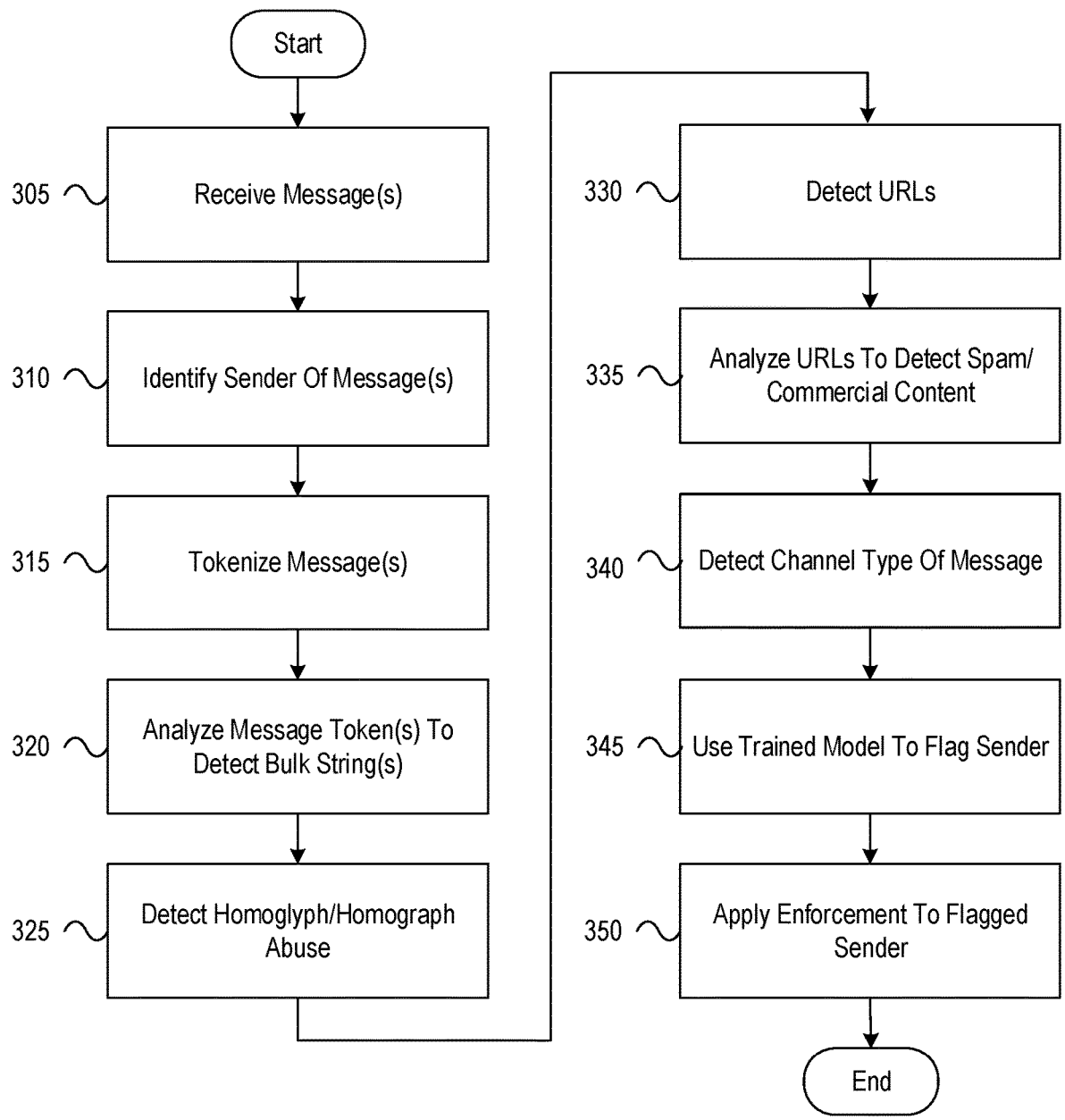
FIG. 3 depicts an illustrative method for performing commercial and spam messaging detection and enforcement in accordance with one or more example embodiments.

FIG. 3 depicts an illustrative method for performing commercial and spam messaging detection and enforcement in accordance with one or more example embodiments. Referring to FIG. 3, at step 305, a computing platform having at least one processor, a communication interface, and memory may receive one or more messages, which may be text messages such as SMS messages. At step 310, the computing platform may identify a sender of the received one or more messages. At step 315, the computing platform may tokenize the received one or more message(s) to yield one or more token(s), and at step 320 the computing platform may analyze the message token(s) to detect one or more bulk string(s). At step 325, the computing platform may detect the abuse of homoglyphs and/or homographs in the text of the messages. Then, at step 330, the computing platform may detect one or more URLs in the messages, and at step 335, the computing platform may analyze the URLs to find information whether they link to spam and/or commercial content. At step 340, the computing platform may detect a type of channel (e.g., A2P vs. P2P) for each message. At step 345, the computing platform may use a machine learning or regression model to analyze, based on the data generated at steps 320, 325, 335, and 340, whether the sender of the messages is a spam and/or commercial sender. Then, at step 350, the computing platform may apply an enforcement policy based on whether the sender is a spam and/or commercial sender.

The analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   at a message scanning computing platform comprising one or more processors, a communication interface, and memory storing computer-readable instructions:
      receiving, via the communication interface, by the one or more processors, a plurality of text messages from a sender;
      tokenizing, by the one or more processors, the plurality of text messages to yield a plurality of tokens;
      matching, by the one or more processors, one or more tokens of the plurality of tokens in the plurality of text messages to one or more bulk string tokens;
      detecting, by the one or more processors, one or more homoglyphs in the plurality of text messages;
      detecting, by the one or more processors, one or more uniform resource locators (URLs) in the plurality of text messages;
      flagging, by the one or more processors, the sender based at least on the one or more matching tokens, the one or more detected homoglyphs, and the one or more detected URLs;
      based on flagging the sender, blocking, by the one or more processors, one or more messages from the sender;
      wherein the plurality of text messages is received via a peer-to-peer (P2P) channel, and wherein the sender is flagged as a commercial sender, the method further comprising:
      comparing, by the one or more processors, a number of the plurality of text messages received to a threshold; and
      based on the number satisfying the threshold, transmitting, via the communication interface, by the one or more processors, to the sender, a notification that future messages must be delivered via an application to person (A2P) channel.

2. The method of claim 1, wherein the sender is flagged as a spam sender.

3. The method of claim 1, further comprising:
   retrieving, by the one or more processors, a training data set, wherein the training data set includes input data comprising data indicating one or more bulk string tokens in text messages, data indicating homoglyphs in text messages, and data indicating URLs in text messages, wherein the training data set further includes target data comprises an indication of a flag to be applied to the messages; and
   training, by the one or more processors, a model using the training data set.

4. The method of claim 3, wherein the flagging of the sender comprises:
   using the one or more matching tokens, the one or more detected homoglyphs, and the one or more detected URLs to generate inputs to the model; and
   providing the inputs to the model to generate an output, wherein the output indicates that the sender should be flagged.

5. The method of claim 3, wherein the inputs to the model include frequency information for the one or more matching tokens, the one or more detected homoglyphs, or the one or more detected URLs.

6. The method of claim 1, further comprising:
receiving, by the one or more processors, the text messages from a plurality of different telephone numbers; and
using, by the one or more processors, a clustering algorithm to associate the plurality of different telephones numbers with the sender.

7. The method of claim 6, further comprising:
blocking text messages received from the plurality of different telephone numbers.

8. The method of claim 1, further comprising categorizing, by the one or more processors, one or more of the matched tokens into a category associated with the bulk string token, wherein the category is selected from a list of categories, wherein the list of categories includes one or more of:
an advertisement,
spam, or
a political message.

9. The method of claim 1, further comprising:
prior to flagging the sender, and based on the number not satisfying the threshold, waiting, by the one or more processors, to receive additional messages before flagging the sender.

10. The method of claim 1, wherein the detecting the one or more homoglyphs comprises:
analyzing a message to detect a most common script of character used in the message; and
detecting a homoglyph based on detecting a character of the message that is a different script from the most common script.

11. The method of claim 1, wherein the detecting the one or more homoglyphs comprises:
substituting at least one character of a word for a homoglyph;
comparing the word with the substituted character to a dictionary; and
detecting that at least one character of the word is a homoglyph based on the comparison.

12. The method of claim 1, further comprising categorizing, by the one or more processors, the detected URLs as one or more of:
unknown URLs,
URLs associated with spam, or
URLs associated with commercial domains.

13. An computing platform comprising:
one or more processors;
a communication interface, and
memory storing computer-readable instructions that, when executed by the one or more processors, cause the computing platform to:
receive, via the communication interface, a plurality of text messages from a sender;
tokenize the plurality of text messages to yield a plurality of tokens;
match one or more tokens of the plurality of tokens in the plurality of text messages to one or more bulk string tokens;
detect one or more homoglyphs in the plurality of text messages;
detect one or more uniform resource locators (URLs) in the plurality of text messages;
flag the sender based at least on the one or more matching tokens, the one or more detected homoglyphs, and the one or more detected URLs;
based on flagging the sender, block one or more messages from the sender,
wherein the plurality of text messages is received via a peer-to-peer P2P) channel, and wherein the sender is flagged as a commercial sender, the instructions further causing the computing platform to;
compare a number of the plurality of text messages received to a threshold; and
based on the number satisfying the threshold, transmit, via the communication interface and to the sender, a notification that future messages must be delivered via an application to person (A2P) channel.

14. The computing platform of claim 13, wherein the sender is flagged as a spam sender.

15. The computing platform of claim 13, wherein the flagging of the sender comprises:
using the one or more matching tokens, the one or more detected homoglyphs, and the one or more detected URLs to generate inputs to a machine learning model; and
providing the inputs to the machine learning model to generate an output, wherein the output indicates that the sender should be flagged.

16. One or more non-transitory computer-readable media comprising instructions that, when executed by a computing platform comprising one or more processors and a communication interface, cause the computing platform to:
receive, via the communication interface, a plurality of text messages from a sender;
tokenize the plurality of text messages to yield a plurality of tokens;
match one or more tokens of the plurality of tokens in the plurality of text messages to one or more bulk string tokens;
detect one or more homoglyphs in the plurality of text messages;
detect one or more uniform resource locators (URLs) in the plurality of text messages;
flag the sender based at least on the one or more matching tokens, the one or more detected homoglyphs, and the one or more detected URLs;
based on flagging the sender, block one or more messages from the sender,
wherein the plurality of text messages is received via a peer-to-peer (P2P) channel and wherein the sender is flagged as a commercial sender, the instructions further causing the computing platform to;
compare a number of the plurality of text messages received to a threshold; and
based on the number satisfying the threshold, transmit, via the communication interface and to the sender, a notification that future messages must be delivered via an application to person (A2P) channel.

17. The one or more non-transitory computer-readable media of claim 16, wherein the sender is flagged as a spam sender.

* * * * *